(12) United States Patent
Miller

(10) Patent No.: US 7,521,399 B2
(45) Date of Patent: *Apr. 21, 2009

(54) DRILLING FLUIDS CONTAINING BIODEGRADABLE ORGANOPHILIC CLAY

(75) Inventor: Jeffrey J. Miller, Spring, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 754 days.

This patent is subject to a terminal disclaimer.

(21) Appl. No.: 11/042,560

(22) Filed: Jan. 25, 2005

(65) Prior Publication Data

US 2006/0166840 A1 Jul. 27, 2006

(51) Int. Cl.
*C09K 8/18* (2006.01)
*C09K 8/584* (2006.01)
*B01F 3/12* (2006.01)

(52) U.S. Cl. .................. 507/132; 507/245; 507/268; 516/34

(58) Field of Classification Search .......... 507/245, 507/268, 311, 132; 516/34
See application file for complete search history.

(56) References Cited

U.S. PATENT DOCUMENTS

| | | | |
|---|---|---|---|
| 2,966,211 A | 12/1960 | Webber | |
| 4,105,578 A | 8/1978 | Finlayson et al. | 252/316 |
| 4,116,866 A | 9/1978 | Finlayson | 252/316 |
| 4,370,272 A | 1/1983 | Wechsler et al. | 260/404 |
| 4,450,095 A | 5/1984 | Finlayson et al. | 252/315.2 |
| 4,536,316 A | 8/1985 | Ramachandran | 252/174.11 |
| 4,569,923 A | 2/1986 | Knudson, Jr. et al. | 501/148 |
| 4,664,842 A | 5/1987 | Knudson, Jr. et al. | 252/315.2 |
| 4,695,402 A | 9/1987 | Finlayson et al. | 252/315.2 |
| 4,769,078 A | 9/1988 | Tso | |
| 4,843,048 A | 6/1989 | House et al. | 501/148 |
| 4,960,740 A | 10/1990 | House et al. | 501/148 |
| 5,021,170 A | 6/1991 | Shumate et al. | 252/8.515 |
| 5,718,841 A | 2/1998 | Mardis et al. | 252/309 |
| 6,036,765 A | 3/2000 | Farrow et al. | 106/487 |
| 6,156,708 A | 12/2000 | Brookey et al. | 507/102 |
| 6,187,719 B1 | 2/2001 | Dino et al. | 507/129 |
| 6,458,343 B1 | 10/2002 | Zeman et al. | 424/63 |
| 6,462,096 B1 | 10/2002 | Dino et al. | 516/101 |
| 6,561,273 B2 | 5/2003 | Brothers et al. | 166/294 |

FOREIGN PATENT DOCUMENTS

| | | |
|---|---|---|
| EP | 0 133 071 A2 | 2/1985 |
| EP | 1 138 740 A1 | 10/2001 |
| WO | WO 01/18147 * | 3/2001 |

OTHER PUBLICATIONS

Baroid brochure entitled "Geltone® Viscosifier" dated 2002.
Baroid brochure entitled "Geltone® II Viscosifier" dated 2002.
Baroid brochure entitled "Geltone® IV Viscosifier" dated 2002.
Baroid brochure entitled "Geltone® V Viscosifier" dated 2002.
Baroid brochure entitled "Suspentone™ Suspension Agent" dated 2004.
Foreign communication from a related counterpart application dated May 31, 2006.
Foreign communication from a related counterpart application dated Nov. 6, 2006.
Office Action for Application No. 11/042,534 dated May 17, 2007.
Office Action from U.S. Appl. No. 11/042,534 dated Sep. 28, 2007.

* cited by examiner

*Primary Examiner*—Timothy J Kugel
(74) *Attorney, Agent, or Firm*—Craig W. Roddy; Baker Botts, LLP

(57) ABSTRACT

Drilling fluids are provided that comprise an organophilic clay treated with a quaternary ammonium surfactant having an amide linkage. The quaternary ammonium surfactant may comprise a compound generally represented by the following formula:

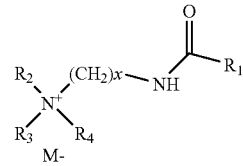

where $M^-$ is an anion such as a chloride, methyl sulfate, bromide, acetate, or iodide ion; $R_1$ is an alkyl group such as a saturated hydrocarbon with 10 or more carbons; $R_2$, $R_3$, and $R_4$ are the same or different alkyl groups such as a methyl, ethyl, or benzyl group, and x is greater than or equal to 1. The organophilic clay treated in this manner is substantially biodegradable. In embodiments, the drilling fluids comprise the foregoing organophilic clay, an oil-based fluid and a weighting agent. In still embodiments, the drilling fluids comprise the foregoing organophilic clay, an invert emulsion, an emulsifier, and a weighting agent.

3 Claims, 1 Drawing Sheet

DRILLING FLUIDS CONTAINING BIODEGRADABLE ORGANOPHILIC CLAY

FIELD OF THE INVENTION

The present invention generally relates to drilling fluids, and more particularly to biodegradable drilling fluids comprising organophilic clay treated with a quaternary ammonium surfactant having an amide linkage.

BACKGROUND OF THE INVENTION

The following paragraphs contain some discussion, which is illuminated by the innovations disclosed in this application, and any discussion of actual or proposed or possible approaches in this Background section does not imply that those approaches are prior art.

Natural resources such as oil or gas residing in a subterranean formation can be recovered by drilling wells that penetrate the formation. In particular, a wellbore is typically drilled down to the formation while circulating a drilling fluid (also known as a drilling mud) through the wellbore. During the drilling process, the drill bit generates drill cuttings that consist of small pieces of shale and rock. The drilling fluid carries the drill cuttings in a return flow stream back to the well drilling platform. After terminating the circulation of the drilling fluid, a string of pipe, e.g., casing, is run in the well bore. The drilling fluid is then usually circulated downwardly through the interior of the pipe and upwardly through the annulus, which is located between the exterior of the pipe and the walls of the well bore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., cementing operations occurring after the primary cementing operation, may also be performed.

Organophilic clays are commonly used in oil-based drilling fluids to increase viscosity and provide for the suspension of particles, such as drill cuttings and weighting agents, therein. Organophilic clays are generally prepared by reacting a hydrophilic clay with an organic cation, usually a quaternary ammonium salt compound produced from a fatty nitrile. Examples of hydrophilic clays include bentonite and hectorite. Native clay surfaces have negatively charged sites and cationic counter-ions such as sodium and calcium cations. Thus, the clay may be treated with a cationic surfactant to displace the cations that are naturally present at the clay surfaces. The cationic surfactant becomes tightly held to the surfaces through electrostatic charges. In this manner, the hydrophilic nature of the clay is reversed, making it more soluble in oil. By way of example, bentonite that primarily contains sodium cations is known as sodium bentonite. Those monovalent sodium cations may be easily displaced from the clay, making a large number of anionic sites available.

As mentioned above, quaternary ammonium compounds are commonly used as the cationic surfactants in preparing the organophilic clays. Quaternary ammonium compounds contain ammonium compounds in which one or more of the hydrogen atoms attached to the nitrogen are substituted by organic radicals. One of the most popular quaternary ammonium compounds of the organophilic clay industry is dimethyl dihydrogenated tallow ammonium chloride ($M_2HT_2N^+$ $Cl^-$). The oil-solubility of this compound is enhanced by its almost complete hydrocarbon structure and its two long-chain alkyl groups. Further, its two methyl groups do not sterically interfere with close packing of the ammonium cation to the clay surface.

The dimethyl dihydrogenated tallow ammonium chloride surfactant, however, cannot be efficiently activated at relatively low temperatures. Improved cationic surfactants have been developed in which the ammonium compounds have greater numbers of alkyl groups. One such surfactant includes a benzyl group that greatly enhances the performance of organophilic clays at cold temperatures near 45° F.

Unfortunately, the quaternary ammonium compounds described above undergo minimal aerobic biodegradation and are toxic and thus may harm the environment. Over time, those compounds may accumulate and become toxic to life, thereby posing a much greater risk to the environment. Due to environmental regulations, costly procedures often must be followed to dispose of drilling fluids containing organophilic clays treated with such compounds, ensuring that they do not contact the marine environment and groundwater. Thus, it is desirable to develop a biodegradable cationic surfactant for use in the formation of an organophilic clay additive for a drilling fluid.

SUMMARY OF THE INVENTION

Some teachings and advantages found in the present application are summarized briefly below. However, note that the present application may disclose multiple embodiments, and not all of the statements in this Summary section necessarily relate to all of those embodiments. Moreover, none of these statements limit the claims in any way.

According to embodiments, drilling fluids comprise an organophilic clay treated with a quaternary ammonium surfactant having an amide linkage. The quaternary ammonium surfactant may comprise a compound generally represented by the following formula:

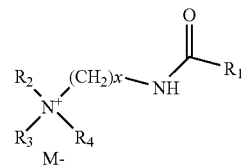

where $M^-$ is an anion such as a chloride, methyl sulfate, bromide, acetate, or iodide ion; $R_1$ is an alkyl group such as a saturated hydrocarbon with 10 or more carbons; $R_2$, $R_3$, and $R_4$ are the same or different alkyl groups such as a methyl, ethyl, or benzyl group, and x is greater than or equal to 1. The organophilic clay treated in this manner is substantially biodegradable.

In additional embodiments, drilling fluids comprise: an oil-based fluid; an organophilic clay treated with a quaternary ammonium surfactant having an amide linkage; and a weighting agent.

In still more embodiments, drilling fluids comprise: an invert emulsion; an organophilic clay treated with a quaternary ammonium surfactant having an amide linkage; an emulsifier; and a weighting agent.

DETAILED DESCRIPTION OF THE EMBODIMENTS

Figure 1:
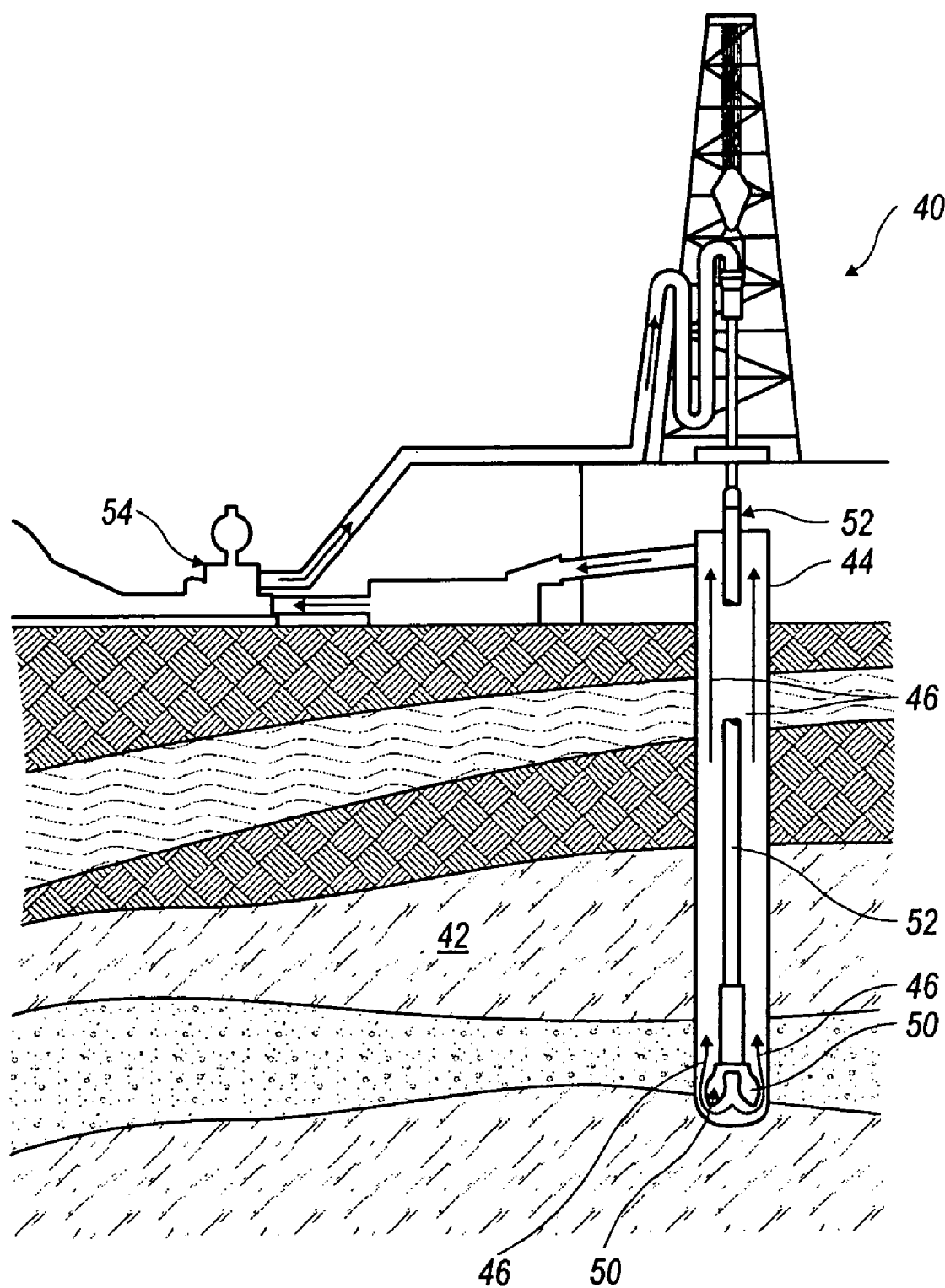
FIG. 1 illustrates the drilling of a wellbore using the drilling fluid described herein.

Drilling fluids may include an organophilic clay that has been treated with a quaternary ammonium surfactant having an amide linkage. This type of cationic surfactant is substantially biodegradable, meaning that it is capable of being decomposed by natural biological processes. In particular, it undergoes aerobic biodegradation, which is the breakdown of organic chemicals by microorganisms when oxygen is present. In this process, aerobic bacteria use oxygen as an electron acceptor and break down organic chemicals into smaller organic compounds, often producing carbon dioxide and water as the final product. Therefore, organophilic clays treated with the biodegradable cationic surfactant may be used in drilling fluids for drilling a wellbore without being concerned that the surfactant could accumulate in the environment. As such, the surfactant usually never reaches toxic levels that could harm the surrounding environment and the life supported by that environment. Not only does the use of a biodegradable surfactant benefit the environment, it also alleviates the need to expend energy to clean-up non-biodegradable clays and thus prevent them from contaminating the environment.

The drilling fluids typically comprise an oil-based fluid such as diesel oil, mineral oil, invert emulsions containing water droplets dispersed in oil, synthetic olefins, esters, or combinations thereof. The water contained in such invert emulsions may comprise fresh water or salt water such as brine or sea water. An example of a suitable brine is calcium chloride brine. The oil-to-water volumetric ratio in the invert emulsions may be in a range of from about 95:5 to about 50:50, or alternatively from about 90:10 to about 70:30. Examples of raw materials used in organophilic clay (also known as organoclay) manufacturing include but are not limited to bentonite such as sodium bentonite, attapulgite, hectorite, and combinations thereof. The amount of organophilic clay in the drilling fluid may be in a range of from about 2 pounds/barrel (lbs/bbl) to about 20 lbs/bbl.

Any quaternary ammonium surfactant having an amide linkage that is suitable for displacing the cations of the organophilic clay may be employed to treat the clay. The amount of surfactant relative to the clay may vary depending on the type of clay being used and the methods of processing. In embodiments, a weight ratio of the quaternary ammonium surfactant to organophilic clay (e.g., sodium bentonite) may be in a range of from about 1:1 to about 1:2, alternatively from about 9:10 to about 2:3, or alternatively from about 3:4 to about 17:20. In embodiments, quaternary ammonium surfactants for treating the organophilic clays may be generally represented by the following formula:

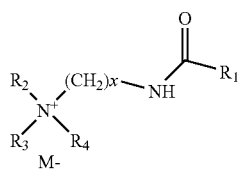

where $M^-$ is an anion; $R_1$ is an alkyl group; $R_2$, $R_3$, and $R_4$ are the same or different alkyl groups, and x is greater than or equal to 1. In embodiments, $M^-$ is a chloride, methyl sulfate, bromide, acetate, or iodide ion, $R_1$ is a saturated hydrocarbon having 10 or more carbon atoms, and $R_2$, $R_3$, and $R_4$ are methyl groups, ethyl groups, benzyl groups, or combinations thereof. When one of $R_2$, $R_3$, or $R_4$ is a benzyl group, the biodegradability of the surfactant is somewhat reduced but still significant while the performance of the organophilic clay increases dramatically.

Examples of such quaternary ammonium surfactants include compounds generally represented by the following formula:

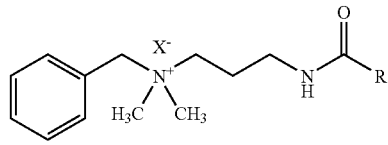

where R is an alkyl group and $X^-$ is an anion. In an embodiment, R is a saturated alkyl group comprising at least 10 carbon atoms and $X^-$ is a chloride, iodide, bromide, acetate, or methyl sulfate ion. As shown, such compounds contain a stearic alkyl group connected through the amide linkage and two methyl groups and a benzyl group on the ammonium ion. A quaternary ammonium surfactant of this type and having a $C_{18}$ saturated alkyl group substituted for R and a chloride ion substituted for $X^-$ is commercially available from the Stepan Co. under the tradename of AMMONYX SDBC surfactant. Examples of additional quaternary ammonium surfactants may be generally represented by the following formula:

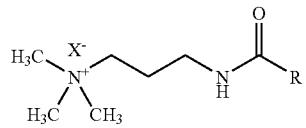

where R is an alkyl group and $X^-$ is an anion. In an embodiment, R is a saturated alkyl group comprising at least 10 carbon atoms and $X^-$ is a chloride, iodide, bromide, acetate, or methyl sulfate ion. A quaternary ammonium surfactant of this type and having a $C_{18}$ saturated alkyl group substituted for R and a chloride ion substituted for $X^-$ is commercially available from the Stepan Co. under the tradename of AGENT X2506-13 surfactant.

The drilling fluids may further include additional additives as deemed appropriate by one skilled in the art. Examples of such additives include but are not limited to an emulsifier, a filtration control agent, a weighting agent, calcium hydroxide (i.e., lime), or combinations thereof. In an embodiment, all of the components in the drilling fluid may be environmentally safe to allow them to be used in environmentally sensitive regions. In this case, all of the surfactants contained in the drilling fluid are typically biodegradable, including the emulsifiers.

The drilling fluids described above may be prepared by combining the organophilic clay, which has been pre-treated with the quaternary ammonium surfactant, with the other components, such as the oil-based fluid, using techniques known in the art. In one embodiment, the drilling fluids may be prepared at an off-site location away from the wellbore drilling site. In this case, they are shipped to the wellbore drilling site where they may be used immediately or stored until their use is desired. In another embodiment, the surfactant-treated organophilic clay may be separately stored at an on-site location near the wellbore drilling site, allowing it to be added to a drilling fluid as needed. The presence of the organophilic clay in a drilling fluid increases its viscosity such that it is pumpable and less likely to be lost to a subterranean formation as it is circulated through a wellbore that penetrates the formation. The clay also improves the ability of the drilling fluid to suspend solids such as drill cuttings and weighting agents therein. The performance of the clay in the drilling fluid may vary depending on the system in which it is placed, i.e., the types of the other components in the fluid, such as the surfactants.

The clay may be treated with the quaternary ammonium surfactant having an amide linkage by first placing the clay in water to hydrate the clay. The resulting slurry may then be filtered through a sieve to remove impurities, followed by passing it through an ion exchange column to remove divalent cations. The slurry may then be heated and stirred while the quaternary ammonium surfactant is added thereto. It may be heated at a temperature in the range of from about 140° F. to about 155° F. for a period of time effective to react the surfactant with the organophilic clay. Thereafter, the clay treated with the surfactant may be dried by filtering it and heating the resulting filter cake at a temperature in a range of from about 140° F. to about 150° F. for a period of time effective to dry the filter cake. The dried organophilic clay may then be ground to ensure that it can be easily dispersed in fluid, followed by filtering it through a sieve to generate a consistent particle size.

The organophilic clay treated with the quaternary ammonium surfactant having an amide linkage is typically insoluble in water and not completely soluble in oil; however, it interacts more with oil than would a clay that has not been treated with the surfactant. As such, it is more compatible with oil-based drilling fluids. The organophilic clay also may have a Loss of Organic mass by Ignition (LOI) in a range of from about 30% to about 50% by weight, or alternatively in a range of from about 35% to about 45%. The LOI indicates the amount of organic matter, i.e., surfactant, present in the organophilic clay. Without intending to be limited by theory, it is believed that treating the organophilic clay with a quaternary ammonium surfactant having an amide linkage as opposed to an ester linkage (a conventional treatment method) makes the clay more hydrophobic. As a result, the clay is less likely to attract water that could undesirably limit its ability to viscosify the drilling fluid and suspend solids in the fluid.

FIG. 1 depicts a drill rig 40 for drilling a wellbore 44 that penetrates the earth 42 using the drilling fluid containing the surfactant-treated organophilic clay. A drill bit 50 may be mounted on the end of a drill string 52 comprising several sections of drill pipe. The wellbore 44 may be drilled by using a rotary drive at the surface to rotate drill string 52 and to apply torque and force to urge drill bit 50 to extend through wellbore 44. The drilling fluid may be displaced through drill string 52 using one or more pumps 54. The drilling fluid may be circulated past drill bit 50 and back to the surface as indicated by arrows 46, thereby removing drill cuttings from the wellbore (i.e., material such as rock generated by the drilling). In an embodiment, the drilling fluid may be employed for general drilling of boreholes in subterranean formations, particularly through non-producing zones. In another embodiment, the drilling fluid may serve as a so-called "drill-in" fluid designed for drilling through producing zones (i.e., zones of a subterranean formation bearing hydrocarbons).

EXAMPLES

The invention having been generally described, the following example is given as a particular embodiment of the invention and to demonstrate the practice and advantages thereof. It is understood that the example is given by way of illustration and is not intended to limit the specification or the claims to follow in any manner.

Wyoming sodium bentonite was hydrated in water and then filtered twice through a 400-mesh sieve to remove impurities. The resulting slurry was passed through an ion exchange column to remove divalent cations. An aliquot of slurry was dried, and the concentration of dry bentonite was found to be 2.92% by weight of the aliquot. One kilogram of the slurry also was heated to 140-155° F. while stirring. Then 22.6 grams of AMMONYX SDBC surfactant were added to the heated slurry over a period of approximately 5 minutes, followed by stirring the mixture an additional 30 minutes at 150° F. The slurry was thereafter filtered through Whatman 50 paper placed within a Buchner funnel to remove water. A filter cake was removed from the filter paper and dried for 16 hours at 140-150° F., thereby forming a biodegradable organophilic clay in accordance with an embodiment. The dried organophilic clay was ground in a hammermill and then sieved through a 100-mesh screen. The moisture content and LOI of the organophilic clay were determined to be 1.5% and 37.0% by weight of the organophilic clay, respectively.

As shown in Table 1 below, the ground organophilic clay was then used to prepare a 350.5 mL drilling fluid sample (sample B). In addition to the organophilic clay, sample B contained XP-07 hydrocarbon (approximately a $C_{12}$-$C_{16}$ linear paraffin), water, 11.6 pound (lb)/gallon (gal) calcium chloride brine, a co-emulsifier, a BDF-364 emulsifier, calcium hydroxide (lime), BAROID weighting agent (barium sulfate) commercially available from Halliburton Energy Services, Inc. The components in sample B were first mixed with a MULTIMIXER mixer commercially available form Sterling Multi-Products Inc. of Prophetstown, Ill. and then with a SILVERSON mixer commercially available from Silverson Machines Limited of the United Kingdom. Sample B was further hot rolled for 16 hours at 150° F. The amounts of the components in the drilling fluid sample B are shown in Table 1.

A 350.5 mL control sample (sample A) was also prepared that contained all of the same components except that the biodegradable organophilic clay was replaced with GELTONE II organophilic clay, which is commercially available from Halliburton Energy Services, Inc. GELTONE II clay is not sufficiently biodegradable to be used in some areas but exhibits good properties. The components in the control sample A were first mixed with the MULTIMIXER mixer and then with a SILVERSON mixer. The control sample A was further hot rolled for 16 hours at 150° F. Table 1 also illustrates the amounts of the components in control sample A.

The drilling fluid sample B and the control sample A were then tested to determine the plastic viscosity in centipoise (cp), the yield point, the 10-second gel strength, the 10-minute gel strength, and the Fann 35A viscometer dial readings of those samples. The tests were performed in accordance with American Petroleum Institute Recommended Practice 13B-2, $3^{rd}$ Edition, February 1998. The results of the tests are presented in Table 1.

TABLE 1

| | Sample | | | | | | | |
|---|---|---|---|---|---|---|---|---|
| | A (control) | | | | B | | | |
| XP-07, barrel (bbl) | 0.550 | | | | 0.550 | | | |
| Water, bbl | 0.120 | | | | 0.120 | | | |
| Brine, bbl | 0.148 | | | | 0.148 | | | |
| Co-emulsifier, lb | 3 | | | | 3 | | | |
| BDF-364, lb | 2 | | | | 2 | | | |
| Lime, lb | 2 | | | | 2 | | | |
| BAROID, lb | 228 | | | | 228 | | | |
| Organophilic clay, lb | 7.0 | | | | 10.5 | | | |
| | Properties of A | | | | Properties of B | | | |
| Temperature, °F. | 50 | 85 | 120 | 150 | 50 | 85 | 120 | 150 |
| Plastic Viscosity, cp | 47 | 25 | 18 | 15 | 66 | 40 | 29 | 23 |
| Yield Point, lb/100 ft$^2$ | 40 | 15 | 11 | 10 | 32 | 17 | 12 | 9 |
| 10-Sec Gel Strength, lb/100 ft$^2$ | 15 | 6 | 5 | 5 | 16 | 6 | 5 | 4 |
| 10-Min Gel Strength, lb/100 ft$^2$ | 15 | 7 | 6 | 5 | 47 | 18 | 8 | 6 |
| | Fann 35A dial readings | | | | | | | |
| 600 rpm | 134 | 65 | 47 | 40 | 164 | 97 | 70 | 55 |
| 300 rpm | 87 | 40 | 29 | 25 | 98 | 57 | 41 | 32 |
| 200 rpm | 68 | 29 | 22 | 20 | 73 | 43 | 31 | 24 |
| 100 rpm | 47 | 19 | 15 | 14 | 46 | 27 | 19 | 15 |
| 6 rpm | 17 | 7 | 6 | 6 | 17 | 7 | 5 | 4 |
| 3 rpm | 15 | 6 | 5 | 5 | 16 | 6 | 4 | 3 |

As illustrated in Table 1, the properties of the drilling fluid containing the biodegradable organophilic clay described herein were comparable to those of the drilling fluid containing GELTONE II organophilic clay. It is noted that a larger quantity of the biodegradable clay than of the control clay was used to obtain similar properties. In particular, the yield point, which measures the carrying capacity, is very similar for both types of drilling fluids and varies little over a wide temperature range.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above but is only limited by the claims which follow, that scope including all equivalents of the subject matter of the claims. Each and every claim is incorporated into the specification as an embodiment. Thus, the claims are a further description and are an addition to the embodiments of the present invention. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A drilling fluid comprising a nonaqueous phase and an organophilic clay treated with a quaternary ammonium surfactant having an amide linkage, wherein the quaternary ammonium surfactant comprises a compound generally represented by the following formula:

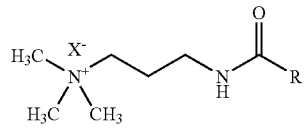

wherein the R is an alkyl group and the X$^-$ is an anion.

2. The drilling fluid of claim 1, wherein the R is a saturated alkyl group comprising at least 10 carbon atoms.

3. The drilling fluid of claim 1, wherein the X$^-$ is selected from the group consisting of chloride, iodide, bromide, acetate, or methyl sulfate.

* * * * *